United States Patent [19]

Widl

[11] Patent Number: 5,721,678

[45] Date of Patent: Feb. 24, 1998

[54] ARRANGEMENT FOR A USE BILLING SYSTEM

[75] Inventor: Andreas Widl, Gräfelfing-Lochham, Germany

[73] Assignee: Mannesmann Aktiengesellschaft, Dusseldorf, Germany

[21] Appl. No.: 525,679

[22] PCT Filed: Mar. 10, 1994

[86] PCT No.: PCT/DE94/00276

§ 371 Date: Sep. 25, 1995

§ 102(e) Date: Sep. 25, 1995

[87] PCT Pub. No.: WO94/22112

PCT Pub. Date: Sep. 29, 1994

[30] Foreign Application Priority Data

Mar. 23, 1993 [DE] Germany ............ 43 10 099.6

[51] Int. Cl.⁶ ............ G07B 15/00; G01C 21/20; G01S 5/14

[52] U.S. Cl. ............ 364/424.04; 364/467; 364/449.7; 364/449.95

[58] Field of Search ............ 364/460, 449.2, 364/449.1, 450, 449.7, 449.95, 449.8, 467, 424.04; 342/357, 457; 455/54.1, 33.1; 379/59; 235/384

[56] References Cited

U.S. PATENT DOCUMENTS 5,144,553  9/1992  Hassett et al. ............ 364/401
5,253,162  10/1993 Hassett et al. ............ 364/405
5,257,195  10/1993 Hirata ............ 364/449
5,310,999  5/1994  Claus et al. ............ 235/384
5,451,758  9/1995  Jesadanont ............ 235/384
5,452,217  9/1995  Kishi et al. ............ 364/449
5,557,524  9/1996  Maki ............ 364/424.04

FOREIGN PATENT DOCUMENTS 0519630  12/1992  European Pat. Off. .
3537730  4/1987  Germany .

Primary Examiner—Michael Zanelli
Attorney, Agent, or Firm—Cohen, Pontani, Lieberman, Pavane

[57] ABSTRACT

A use billing system with an arrangement for identifying distances traveled by a moving object within a system of traveled distances or for identifying fixed geographical zones entered by the object. In order to provide a billing arrangement which is universally applicable as far as possible and which requires little expenditure on infrastructure, a system is provided which is installed independently for wireless transmission of information to detect the current geographical position of the object. The moving object carries a reception system to receive the information transmitted over the air and a storage device for temporary storage of data. A second storage device for permanent storage of predetermined data is also carried. The object further carries a comparison device for comparing these data. An identification device is carried by the object for identifying the respective traveled distance. A mobile storage module which can be connected with the identification device by computer techniques is also provided.

29 Claims, 2 Drawing Sheets

1

ARRANGEMENT FOR A USE BILLING SYSTEM

BACKGROUND OF THE INVENTION

1. Field of the Invention

The invention is directed to a use billing system with an arrangement for identifying distances traveled by a moving object (e.g., a passenger automobile, motorcycle, truck, bus, ship, railroad train, aircraft, person, piece item) within a system of traveled distances (e.g., a highway system, waterway system, railroad system) or for identifying geographical zones (e.g., inner-city zones, air space zones, nature preserve zones) entered by the object.

2. Description of the Prior Art

A position detection system for a motor vehicle is known from EP-A-0 519 630. This system determines position data via the GPS system and shows the data on a display. This GPS system is also used for another position detection system described in EP-A-0 519 630. The data can be recorded on a memory card or a PC.

Finally, DE-A-35 37 730 discloses an arrangement for automatically homing on a target point. For this purpose, position finding is carried out via a transmitter in a known location and the actual course of the moving object is determined therefrom.

Charges for the use of bridges or tunnels are commonly collected at toll stations similar to border posts, where the fee is collected by personnel or automatic coin payment machines. In order to charge for the use of sections of highway in France and Italy, a system is used in which the driver takes a ticket on which the entry point is marked in a machine-readable manner when entering the highway and at the junction between a toll-free highway section and a toll highway section. At the exit or when passing from a toll highway section to a toll-free highway section, the total traveled distance can be determined by means of this ticket and the respective use charge can be calculated and collected. Although this system enables reliable billing, its use requires not only considerable investment to provide the necessary infrastructure, in particular for construction of toll stations with automatic ticket machines, barriers and lighting installations, etc., but also a considerable expense for personnel to man the toll stations during the day and night. An additional grave disadvantage consists in that the toll collecting activities severely impede the flow of traffic especially at peak traffic hours.

In order to avoid this expense, Switzerland has for a number of years employed a different system for collecting tolls for the use of highways which is based on a lump payment for a fixed time period. In exchange for a lump payment, the driver receives a sticker which is to be placed in a visible location in the vehicle and which shows an externally visible authorization to travel on the highway and accordingly presents a verifiable record. This system requires no substantial expenditure on infrastructure, since it can make use of existing installations for selling the stickers (e.g., post offices, border posts) and for monitoring (e.g., highway entries and exits). However, it is not possible to charge for the actual extent of use, so that the calculation of costs does not adequately take into account the principle that payment should be commensurate with use.

Systems which permit an individual charge based on the actual extent of use have also already been suggested. However, these systems require that a suitable local infrastructure be provided, since they are based, for instance, upon infrared systems or so-called h-f transponder systems or r-f transponder systems, that is, upon special mechanical devices for detecting and identifying individual vehicles on the toll routes in question or in corresponding fixed geographical zones such as inner-city zones in which automobile traffic is to be restricted. The transponder technique has been known for some years from its use in the field of military air traffic for distinguishing enemy flying objects from friendly flying objects. The applied principle consists in that an object to be identified is "beamed" (e.g., by radar) from a monitoring station (e.g., a ground station, a ship or an aircraft) and an appropriate identification signal is then sent automatically to the respective monitoring station. In order to transfer this principle to a highway toll charging system, for instance, suitable mechanical monitoring stations would have to be provided at determined points along the highway toll route system (particularly at entry and exit points) to enable a complete acquisition of the data required for use billing. Accordingly, a system of this kind requires a considerable expenditure for providing a special infrastructure covering a surface area.

SUMMARY OF THE INVENTION

The object of the present invention is to an arrangement of the type mentioned above which is suitable not only for charging fees for highway use, but also for detecting other instances of use of defined zones (distances, surface areas, spaces) by moving objects and which requires comparatively little expenditure on infrastructure.

Pursuant to this object, and others which will become apparent hereafter, one aspect of the present invention resides in a use billing system having an arrangement for identifying distances traveled by a moving object within a system of traveled distances or for identifying fixed geographical zones entered by the object. The use billing system includes a transmission system installed outside the moving object independently from the distances and fixed geographical zones to be traveled for wireless transmission of information to detect the current geographical position of the object. A reception system is carried by the moving object and is operative to receive the information from the transmission system for detecting the position which is transmitted over the air. A first storage device as carried by the object for a temporary storage of data concerning the current geographical position of the object. A second storage device is carried by the object for permanent storage of predetermined geographical positions for unequivocal identification of the individual travel distances of the system of traveled distances and/or the fixed geographical zones. A comparison device is carried by the object for preparing the respective geographical position of the object determined at regular intervals with the position data of the identification points. An identification device that is also carried by the object identifies the distance traveled by the object and/or the fixed geographical zone entered or exited by the object on the basis of the geographical positions which have just been passed by the object and which have been determined by the comparison device and agree with the identification points. Finally, the billing system has a mobile storage module which can be connected with the identification device by computer techniques and in which the respective identified distances currently being traveled and/or the presence in a fixed geographical zone is logged.

BRIEF DESCRIPTION OF THE DRAWING

The invention will be described more fully in the following with reference to a system for charging fees for the use of highways by way of example. The drawing in FIG. 1 shows a section of a road system with a highway.

DETAILED DESCRIPTION OF THE PREFERRED EMBODIMENTS

Figure 1:
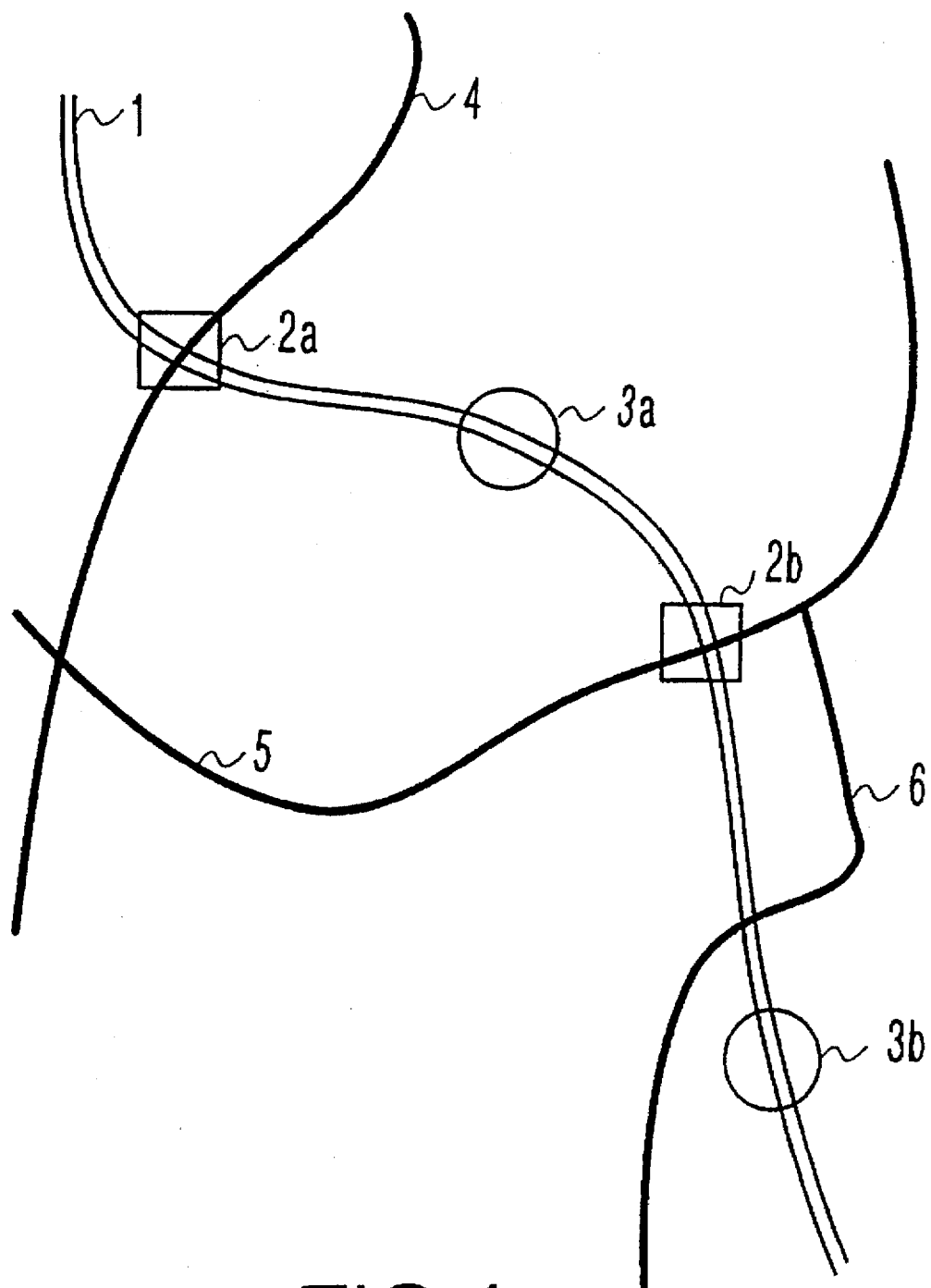
Figure 2:
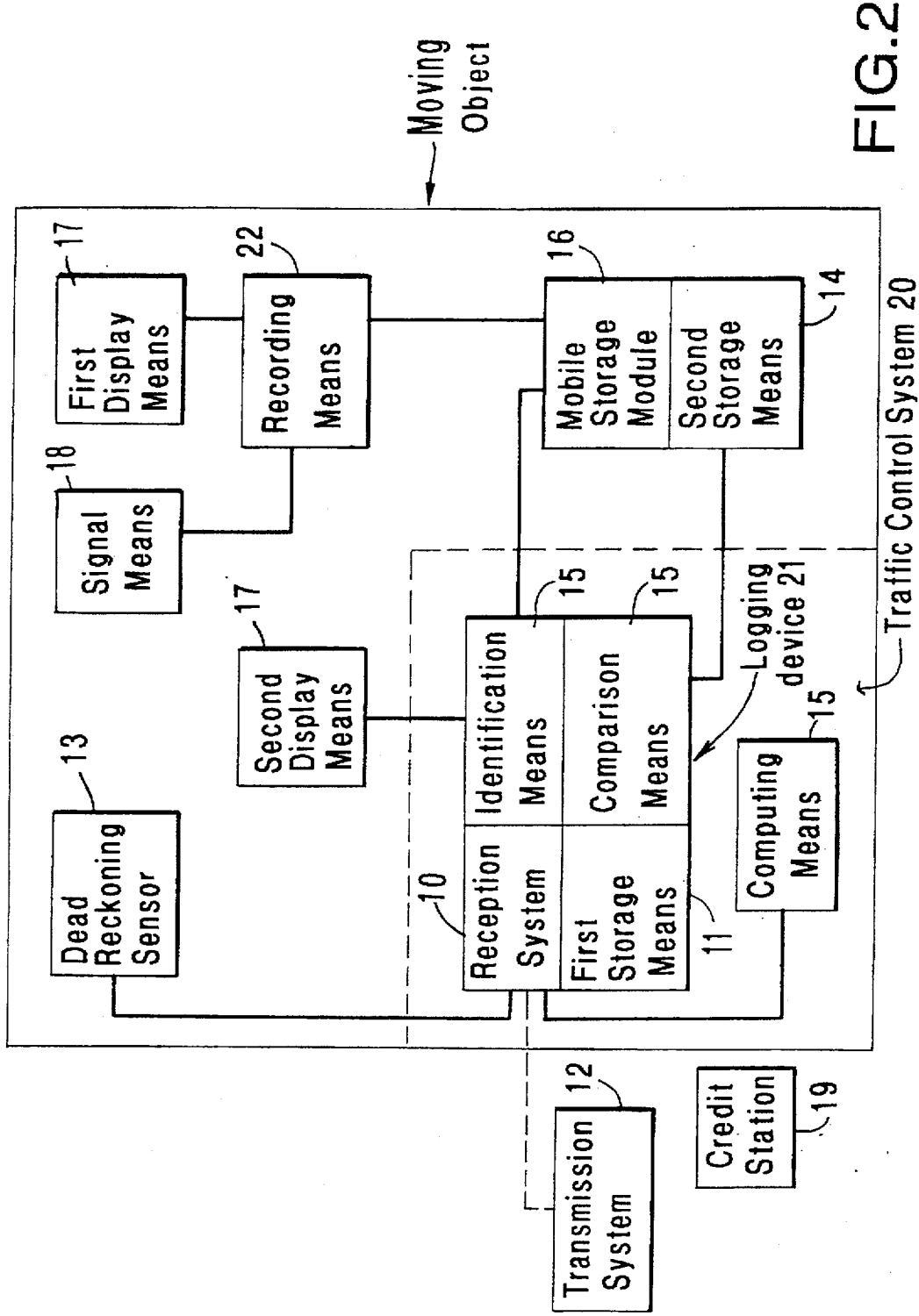
FIG. 2 is a block diagram of the system components.

The system according to the invention is formed of three main functional blocks, namely:

a position detection system on board the vehicle;

a billing system on board the vehicle; and a portable or mobile storage medium for storing billing data.

The position detection system has a system 10 for receiving information for detecting the current geographical position of the vehicle and a first storage device 11 for temporary storage of the current position. The information for position detection is received over the air by a system 12 installed independently from the highway system. This system is often already present or can be adjusted at relatively low cost for the purpose of transmitting appropriate information. Some examples are existing satellite navigation systems (e.g., GPS, GLONASS) or direction finder systems based on existing mobile telephone communications networks (e.g., the German C-, D-, and E-networks) by which a very accurate position detection can be effected on the basis of different signal propagation times to neighboring ground stations. In satellite navigation systems, it may be advantageous to provide the opportunity to receive correction signals (e.g., for the differential GPS system) in order to increase the accuracy of position detection. This compensates for influences due to errors such as satellite orbit errors, timing errors, and signal propagation errors and enables a location resolution of less than 10 m. A correction signal of this kind could be transmitted, for instance, by radio broadcasting (e.g., RDS) or by a GSM mobile communications network. Other systems which determine the vehicle position from radio contact and from sensor equipment installed in the vehicle are also possible. For example, a sensor for determining mileage (e.g., via the revolutions of the rear wheels) and a fluxgate can be provided which enable accurate position-finding with reference to a digitized system of roads when the position of the vehicle is obtained prior to the start of the trip by means of a communications device installed within the vehicle. A "dead reckoning sensor" 13 (e.g., in the form of a fluxgate) which is carded on board the vehicle can be provided to enable a continuous updating of position data in the event of a temporary malfunction of a position detection system (e.g., due to shielding effects or unfavorable satellite position).

The billing system carried on board the vehicle contains a second storage device 14 for permanent storage of predetermined geographical positions (identification points) allowing for an unambiguous identification of individual traveled distances on the system of routes and/or of fixed zones. Further, there is a computing unit which operates as a comparison device 15 and which constantly compares the current position of the vehicle with the stored position data (coordinates) of the identification points at frequent intervals (e.g., once or twice every second). If the agreement between the position data is sufficiently exact, the computing device identifies the section of highway which has just been traveled over and which can be associated with this identification point. This will be explained in more detail in the following.

The use of identified sections of highway is logged by the computing device on a mobile storage medium 16. By mobile storage medium 16 is meant a device which can be carried by the driver of the vehicle and which, if needed, can be connected with the computing device via a read-write device by computer technique. This mobile storage medium is preferably constructed as a magnetic-tape card or chip storage card. However, other media, e.g., programmable storage components such as PAL components, FPLA components or FPLS components, can also be used.

If the information received externally from the position detection system is not position data in a strict sense, the computing device additionally takes on the task of calculating the coordinates of the respective position of the vehicle from this information. The second storage device with the position data for the identification points can be physically integrated in the first storage device. However, it may also be advantageous to integrate the second storage device in the mobile storage module.

The principle of use billing can be illustrated with reference to the section of a system of distances shown in FIG. 1 which shows a toll highway 1 as well as toll-free roads 4, 5, 6 crossing the highway 1. The entry/exit points 2a and 2b of the highway 1 are identified by squares. The geographical positions of these locations are stored in the second storage device as identification points. When the computing device detects a current vehicle position which is in agreement with the position of square 2a or square 2b (with predetermined accuracy), this can mean that the vehicle is located on a toll section of highway. However, it might also mean that the highway 1 has only been crossed via the toll-free road 4 or 5. Even when a second square is passed, there is still no unequivocal determination in this respect. For example, it is also possible to travel from square 2a to square 2b via roads 4 and 5, that is, just as can be done via the highway 1. For this reason, at least one additional identification point 3a, 3b (marked by a circle) on the highway 1 is provided and stored between every two directly successive entry/exit points on the highway 1. This additional identification point, when passed subsequent to an identified entry point/exit point, enables a completely unequivocal determination to be made regarding the section of highway that has just been traveled over, so that a corresponding record can be made on the mobile storage medium for calculating charges. Highway crossings and highway triangles are also detected as identification points with their position coordinates in order to provide a complete identification of all portions of the network of highway sections.

In principle, it would also be possible to effectively bill for use by the month, for instance, by referring to the recorded instances of use at fee payment locations. However, it is considerably more advantageous to use the mobile storage medium like a telephone card; that is, the user purchases a "highway toll card" thus already acquiring beforehand the authorization to make use of the highway to a determined extent (use credit). When the highway is actually used, the charge for every traveled distance is deducted from the actual use credit by recording means 22.

A great advantage is obtained by storing use rates on the mobile storage medium in addition to the identification points of the highway system in that graduated authorizations for use can be realized in a simple manner. For example, it is possible to issue special highway toll cards for the use of determined regions or routes (e.g., transit highways). Different sets of charges to be applied for different vehicle types (passenger automobiles, motorcycles, busses, trucks) can also easily be taken into account by means of highway toll cards with a suitable different design and which are provided with different rates.

The components of the device according to the invention which are internal to the vehicle and which are preferably designed as compact mobile logging devices 21 can also be physically integrated, for instance, within a car radio, a terminal of a traffic control system 20 or in a mobile telephone set and can accordingly be permanently installed in the vehicle. Mobile devices are particularly handy for calculating charges for foreign vehicles which are not outfitted with corresponding arrangements. Thus, in addition to highway use cards, logging devices 21 could also be issued at border crossings for an appropriate fee. The logging device is preferably activated by inserting the highway use card into a corresponding read-write device. The device can be switched off automatically when the vehicle stops and automatically reactivated as the vehicle begins moving again. Display devices 17 are advantageously installed within the vehicle to alert the driver when driving into a toll zone and to provide a timely, clear indication (similar to a fuel gauge) of the impending depletion of use credit. A continuous display of current use credit is advantageous. Stations 19 at which additional use credit can be purchased for a suitable fee or where a new highway use card can be purchased are preferably provided along the highway routes (e.g., at rest stops, gas stations and parking lots).

If needed, the device according to the invention enables highly differentiated use billing which can also take into account the intensity of use (e.g., it can detect the duration of travel within a toll zone). For this purpose, special possibilities can be provided for input of corresponding parameters. For instance, a sensible variant would be to apply lower rates for individual sections of road or for the entire highway system during off-peak traffic times (e.g., based on season or evening hours) in order to reduce traffic at peak periods by a suitable shifting of traffic.

Unauthorized use of toll sections or zones can be prevented and such improper use can be monitored in an advantageous manner by an outwardly acting signal device 18 (e.g., an h–f transmitter, r–f transmitter, laser diode for infrared signals, etc.) which operates and transmits an "OK" signal when the billing procedure is properly followed and proper use is made of the roads. Externally arranged reception stations (e.g., installed in monitoring vehicles used on the highway exits) can accordingly detect vehicles in which there is no fee detection system or in which the installed system is not being operated properly, that is, when the required fee is not paid. As an alternative or in addition to this, an outwardly acting signal device (e.g., a colored warning light) can be automatically activated when travel within a toll region is extended after the use credit has been exhausted. In such cases, a radio signal which allows the vehicle to be identified can also be sent to a monitoring station. In these cases, the extent of unauthorized use of the highway can be recorded on the mobile storage module for purposes of local traffic patrols.

A substantial advantage of the solution according to the invention consists in that it requires new installation of infrastructure only to a negligible extent, if at all, and enables the use of existing arrangements, that is, arrangements which are installed independently from the respective zone which is subject to use billing. A further important advantage consists in that instances of use subject to charges are determined and calculated in the vehicle automatically so as to provide favorable conditions with respect to protection of data and to exclude unwanted monitoring of driving behavior. No information remains in storage which could enable identification of the total distance traveled by the respective vehicle within the toll region. The temporarily stored information about traveled distances is erased after the use charge has been deducted from the use credit. The coordinates of the last identification point passed by the vehicle which represents the beginning of the route currently being traveled over are filed in the storage each time. However, when necessary, special logging devices which carry out continuous documentation of all traveled distances can be provided, if expressly desired, in order to keep a travel log automatically, e.g., for transportation companies.

As was already mentioned above, use of the arrangement according to the invention is in no way restricted to road traffic, but rather is transferrable to many other applications.

I claim:

1. A use billing system including an arrangement for identifying distances traveled by a moving object within a system of traveled distances and for identifying fixed geographical zones entered by the object, the system comprising:

a transmission system arranged external to the moving object independent of the distances and fixed geographical zones for a wireless transmission of information for determining a current geographical position of the object;

a reception system carried by the moving object and operative to receive the information from the transmission system for determining the position;

first storage means carried by the object for temporarily storing data concerning the current geographical position of the object;

second storage means carried by the object for permanently storing predetermined geographical positions called identification points for unequivocal identification of individual traveled distances of the system of traveled distances and the fixed geographical zones;

comparison means carried by the object for comparing respective geographical positions of the object determined at regular intervals with position data of the identification points;

identification means carried by the object for identifying the distance traveled by the object and the fixed geographical zone entered or exited by the object based upon the geographical positions passed by the object and determined by the comparison means and agreeing with the identification points; and a mobile storage module connectable with the identification means for receiving and storing respective identified distances currently being traveled and presence in a fixed geographical zone.

2. A system as defined in claim 1, and further comprising computing means carried by the object for calculating the geographical position of the object from the information transmitted by the transmission system when the information does not represent position data.

3. A system as defined in claim 1, wherein the transmission system is a satellite navigation system.

4. A system as defined in claim 3, wherein the reception system is adapted to receive correction signals which facilitate improvement of accuracy of the position detection.

5. A system as defined in claim 3, and further comprising a dead reckoning sensor operatively provided in the object to continue providing position data during a temporary malfunction of the navigation system.

6. A system as defined in claim 5, wherein the dead reckoning sensor is a flux gate.

7. A system as defined in claim 1, wherein the transmission system is configured as part of a cellular mobile communications network, the reception system being a mobile telephone and positions of the object being determined based upon different propagation lines of signals from the object to individual reception stations of the mobile communications network, the mobile telephone having means for regular transmission of identification data and for receiving positioning data when the telephone is not in use.

8. A system as defined in claim 1, wherein the transmission system is a direction finder system.

9. A system as defined in claim 1, wherein the mobile storage module is one of a magnetic tape card and a chip storage card.

10. A system as defined claim 1, wherein the second storage means is provided as a component part of the mobile storage module.

11. A system as defined in claim 1, wherein the moving object is a road vehicle and the system of traveled distances is a highway system, the second storage means being operative to permanently store identification points that relate to connection points of the highway and to at least one intermediate point located between two immediately successive connection points on a section of the highway extending between these two connection points.

12. A system as defined in claim 11, including means for recording at least one of an identified distance actually traveled within a system of toll distances and an entry into a fixed geographical zone as a debt of a credit stored in the mobile storage module, the debit being determined along the system of travel distances based on fee information which is stored in one of the second storage means and the mobile storage module.

13. A system as defined in claim 12; and further comprising stations arrangeable at rest stops and gas stations along the system of highways which are operative to provide additional stored credit.

14. A system as defined in claim 12, and further comprising first display means for emitting a signal in the object that warns of an imminent expiration of credit.

15. A system as defined in claim 14, and further comprising second display means arranged in the object and operatively connected to the identification means so as to be activateable thereby when entering a traveled section or geographical zone subject to use billing, said second display means emitting a corresponding signal in the object indicating entry in such a section or zone.

16. A system as defined in claim 12, and further comprising outwardly acting signal means mounted on the object for emitting a signal when at least one of use of a route subject to billing and presence in a corresponding fixed geographical zone extends beyond a depletion of credit.

17. A system as defined in claim 16, wherein the outwardly acting signal means is operative to emit a visual signal.

18. A system according to claim 17, wherein the outwardly acting signal means is operative to emit an infrared signal.

19. A system according to claim 16, wherein the outwardly acting signal means is operative to emit a radio signal.

20. A system as defined in claim 12, and further comprising outwardly acting signal means mounted on the object for sending an "OK" signal as long as proper credit is available.

21. A system as defined in claim 20, wherein the outwardly acting signal means is operative to emit a visual signal.

22. A system according to claim 21, wherein the outwardly acting signal means is operative to emit an infrared signal.

23. A system according to claim 20, wherein the outwardly acting signal means is operative to emit a radio signal.

24. A system as defined in claim 1, wherein the reception system, the first storage means, the comparison means and the identification means are configured as a single logging device.

25. A system as defined in claim 24, wherein the logging device is configured to be activateable by a connection with the mobile storage module.

26. A system as defined in claim 24, wherein the logging device is configured as a component part of a car radio.

27. A system as defined in claim 24, wherein the logging device is configured as a terminal of a traffic control system on board the vehicle.

28. A system as defined in claim 24, wherein the logging device is configured to be removably connected in the use billing system so that the logging device is portable.

29. A system as defined in claim 24, wherein the logging device is operative to determine parameters identifying duration and intensity of use of the system of distances by the object.

* * * * *